(12) United States Patent
Ma et al.

(10) Patent No.: US 8,719,475 B2
(45) Date of Patent: May 6, 2014

(54) METHOD AND SYSTEM FOR UTILIZING LOW POWER SUPERSPEED INTER-CHIP (LP-SSIC) COMMUNICATIONS

(75) Inventors: Kenneth Ma, Cupertino, CA (US); Seong-Ho Lee, Aliso Viejo, CA (US)

(73) Assignee: Broadcom Corporation, Irvine, CA (US)

( * ) Notice: Subject to any disclaimer, the term of this patent is extended or adjusted under 35 U.S.C. 154(b) by 179 days.

(21) Appl. No.: 13/009,210

(22) Filed: Jan. 19, 2011

(65) Prior Publication Data

US 2012/0017016 A1    Jan. 19, 2012

Related U.S. Application Data

(60) Provisional application No. 61/363,938, filed on Jul. 13, 2010.

(51) Int. Cl.
G06F 13/00 (2006.01)
G06F 1/00 (2006.01)
G06F 1/26 (2006.01)
G06F 1/32 (2006.01)

(52) U.S. Cl.
USPC ............................. 710/110; 713/300; 713/320

(58) Field of Classification Search
USPC .................................. 710/110; 713/300, 320
See application file for complete search history.

(56) References Cited

U.S. PATENT DOCUMENTS

| 4,847,549 | A  | * | 7/1989 | Suzuki ........................ 323/288 |
| 6,323,698 | B1 | * | 11/2001 | Fletcher ...................... 327/100 |
| 6,366,115 | B1 | * | 4/2002 | DiTommaso ................. 326/32 |
| 6,392,466 | B1 | * | 5/2002 | Fletcher ...................... 327/392 |
| 7,613,237 | B1 | * | 11/2009 | Talbot ......................... 375/226 |
| 7,839,126 | B2 | * | 11/2010 | Lee ............................. 323/222 |

(Continued)

FOREIGN PATENT DOCUMENTS

| JP | 06282988 A | * | 10/1994 | ........... G11C 11/409 |
| JP | 2005304025 A | * | 10/2005 | ......... H03K 19/0175 |
| JP | 2006203901 A | * | 8/2006 | ............... H03F 3/34 |
| WO | WO 9845944 A2 | * | 10/1998 | ........... H03K 3/0231 |

OTHER PUBLICATIONS

Buchmann et al., "NRC-TR-2006-007: SLVS Test Chip for the MIPI Physical Layer", 2006, Nokia Research Center, retrieved from the Internet on Aug. 21, 2013 at <research.nokia.com/files/tr/NRC-TR-2006-007.pdf>, pp. 1-7.*

(Continued)

Primary Examiner — Faisal M Zaman
(74) Attorney, Agent, or Firm — Sterne, Kessler, Goldstein & Fox PLLC

(57) ABSTRACT

Inter-chip connectivity may be provided in a computing device, which may comprise a USB host and at and at least one USB device embedded within the computing device, based on Universal Serial Bus version 3.0 (USB3.0) interface. In this regard, internal communication of data between the USB host and embedded USB device may be performed via USB3.0 SuperSpeed signals. The USB host and/or the USB3.0 interface may be configured to enable USB3.0 internal communication of data, and to reduce power consumption during the internal communication of data compared to external USB3.0 communications. Configuration of the USB3.0 interface for internal communication of data may comprises modifying and/or adjusting physical (PHY) layer, link layer, and/or protocol layer related parameters, functions, resources, and/or operations. The USB3.0 SuperSpeed signals may be communication using scalable low voltage signaling (SLVS). In this regard, Input/Output (IO) Swing may be set based on loopback training sequence.

19 Claims, 5 Drawing Sheets

(56) References Cited

U.S. PATENT DOCUMENTS

| | | | |
|---|---|---|---|
| 8,185,759 B1* | 5/2012 | Li et al. | 713/310 |
| 2003/0070111 A1* | 4/2003 | Riley | 714/5 |
| 2003/0074588 A1* | 4/2003 | Yin | 713/300 |
| 2003/0172312 A1* | 9/2003 | Takahashi et al. | 713/300 |
| 2004/0184409 A1* | 9/2004 | Schoenborn et al. | 370/249 |
| 2005/0160196 A1* | 7/2005 | Dutton et al. | 710/10 |
| 2006/0233279 A1* | 10/2006 | Ryder et al. | 375/296 |
| 2006/0236141 A1* | 10/2006 | Chang et al. | 713/300 |
| 2006/0271802 A1* | 11/2006 | Yanagawa | 713/300 |
| 2008/0104422 A1* | 5/2008 | Mullis et al. | 713/300 |
| 2008/0178011 A1* | 7/2008 | Hubo et al. | 713/300 |
| 2009/0075607 A1* | 3/2009 | Khoury | 455/127.1 |
| 2009/0222603 A1* | 9/2009 | Den Besten | 710/106 |
| 2009/0312972 A1* | 12/2009 | Muller et al. | 702/82 |
| 2009/0327774 A1* | 12/2009 | Jeyaseelan et al. | 713/320 |
| 2010/0046265 A1* | 2/2010 | Chu et al. | 365/49.17 |
| 2010/0091921 A1* | 4/2010 | Den Besten et al. | 375/354 |
| 2010/0103994 A1* | 4/2010 | Frans et al. | 375/221 |
| 2010/0164638 A1* | 7/2010 | Saw | 331/111 |
| 2010/0275037 A1* | 10/2010 | Lee et al. | 713/189 |
| 2011/0211036 A1* | 9/2011 | Tran | 348/14.08 |
| 2011/0219163 A1* | 9/2011 | Beadnell et al. | 710/315 |
| 2012/0059965 A1* | 3/2012 | Foster | 710/305 |

OTHER PUBLICATIONS

Youngkyun Jeong; Yoon-Chul Choi; Eun-Ji Choi; Seogheon Ham; Kee-Won Kwon; Young-Hyun Jun; Jung-Hoon Chun, "0.37mW/Gb/s low power SLVS transmitter for battery powered applications," Circuits and Systems (ISCAS), 2012 IEEE International Symposium on , pp. 1955,1958, May 20-23, 2012.*

Nieminen, Tero; Viitala, Olli; Voutilainen, Martti; Ryynaenen, Jussi, "A Scalable Low-Voltage Signaling (SLVS) Driver for a Low-Power MIPI M-PHY Serial Link in 40 nm CMOS," Ph.D. Research in Microelectronics and Electronics (PRIME), 2012 8th Conference on , pp. 1,4, Jun. 12-15, 2012.*

Tao Li; Zhiping Yu, "Full-Chip Leakage Verification for Manufacturing Considering Process Variations," Quality Electronic Design, 2008. ISQED 2008. 9th International Symposium on , pp. 220,223, Mar. 17-19, 2008.*

* cited by examiner

METHOD AND SYSTEM FOR UTILIZING LOW POWER SUPERSPEED INTER-CHIP (LP-SSIC) COMMUNICATIONS

CROSS-REFERENCE TO RELATED APPLICATIONS/INCORPORATION BY REFERENCE

This patent application makes reference to, claims priority to and claims benefit from U.S. Provisional Application Ser. No. 61/363,938 filed on Jul. 13, 2010.

The above stated application is hereby incorporated herein by reference in its entirety.

FEDERALLY SPONSORED RESEARCH OR DEVELOPMENT

[Not Applicable].

MICROFICHE/COPYRIGHT REFERENCE

[Not Applicable].

FIELD OF THE INVENTION

Certain embodiments of the invention relate to networking. More specifically, certain embodiments of the invention relate to a method and system for utilizing low power SuperSpeed inter-chip (LP-SSIC) communications.

BACKGROUND OF THE INVENTION

Universal Serial Bus version 2.0 (USB2.0) is one of the most popular system interfaces in the world, and is generally utilized to enable coupling peripheral devices, such as a mouse or a keyboard, to host devices, such as personal computers (PCs). In some instances, internal USB2.0 based communications may also be possible. In this regard, the USB High Speed Inter-Chip (HSIC) specification has been defined to enable USB2.0 based internal communications. However, USB HSIC defines a different physical interface, to enable internal USB based communications, incorporating different physical medium and/or connectivity, requiring dedicated physical layer support at both of host and slave sides to enable USB based communication. In other words, while the data communication appears to be USB based exchanges, the physical connectivity is performed in a way that is different from standard USB2.0 physical connectivity during external communications. Furthermore, USB HSIC supports only up to 480 Mbps data rates, with a practical throughput of less than 360 Mbps; and means by which physical connectivity is provided by the USB HSIC prevent increasing data throughputs beyond these rates. Therefore, the USB HSIC may be insufficient in next generation devices requiring higher data rates, such as 802.11ac, which typically requires throughput of 600 Mbps or higher; 802.11ad, which typically requires throughput of 3 Gbps or higher; and/or other technologies such as WirelessHD and more. The USB2.0 architecture and protocol may also require substantial power consumption if there are multiple devices on the same hierarchy, due to, for example, the broadcasting bus nature.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A system and/or method is provided for utilizing low power SuperSpeed inter-chip (LP-SSIC) communications, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

Certain embodiments of the invention may be found in a method and system for utilizing low power SuperSpeed inter-chip (LP-SSIC) communications. In various embodiments of the invention, internal communication of data within a computing device may be performed based on Universal Serial Bus version 3.0 (USB3.0) interface. The computing device may comprise a Universal Serial Bus (USB) host and at least one USB slave device embedded within the computing device, and which may be operable to support use of Universal Serial Bus version 3.0 (USB3.0) interface for external communication with one or more peripheral USB devices. Accordingly, the computing device may be configured to provide low power SuperSpeed Inter-Chip (LP-SSIC) communication within the computing device, between the USB host and the embedded USB device for example. In this regard, inter-chip connectivity, and/or internal communication of data based thereon may be provided in the computing device based on Universal Serial Bus version 3.0 (USB3.0) interface. The internal communications of data between the USB host and the embedded USB device may be performed via USB3.0 SuperSpeed signaling. The operations of the USB3.0 interface may be configured to enable internal communication of data within the computing device. Furthermore, the USB3.0 interface and/or the USB host may be configured to reduce power consumption during USB3.0 internal communication of data. The computing device may comprise personal computer (PC), a tablet computer, a server, a smartphone, and/or any other type of handheld personal communication devices. Configuration of the USB3.0 interface for internal communications may comprises modifying and/or adjusting physical (PHY) layer, link layer, and/or protocol layer related parameters, functions, resources, and/or operations. The USB3.0 SuperSpeed based signals may be communicated using scalable low voltage signaling (SLVS). In this regard, Input/Output (IO) Swing may be set based on loopback training sequence. The loopback training sequence may comprise setting the IO Swing to a default value at start of the loopback training sequence; and incrementing or decrementing the IO Swing based on determination of error during loopback communication. The configuration of USB3.0 operations for LP-SSIC communications may comprise modifying one or more link operation states during inter-chip communication, wherein the modification comprises turning off Phased Locked Loop (PLL) used for the USB3.0 SuperSpeed based signals during link state U1. Furthermore, USB2.0 operations may be disabled during LP-SSIC communications with the at least one embedded USB device.

Figure 1A:
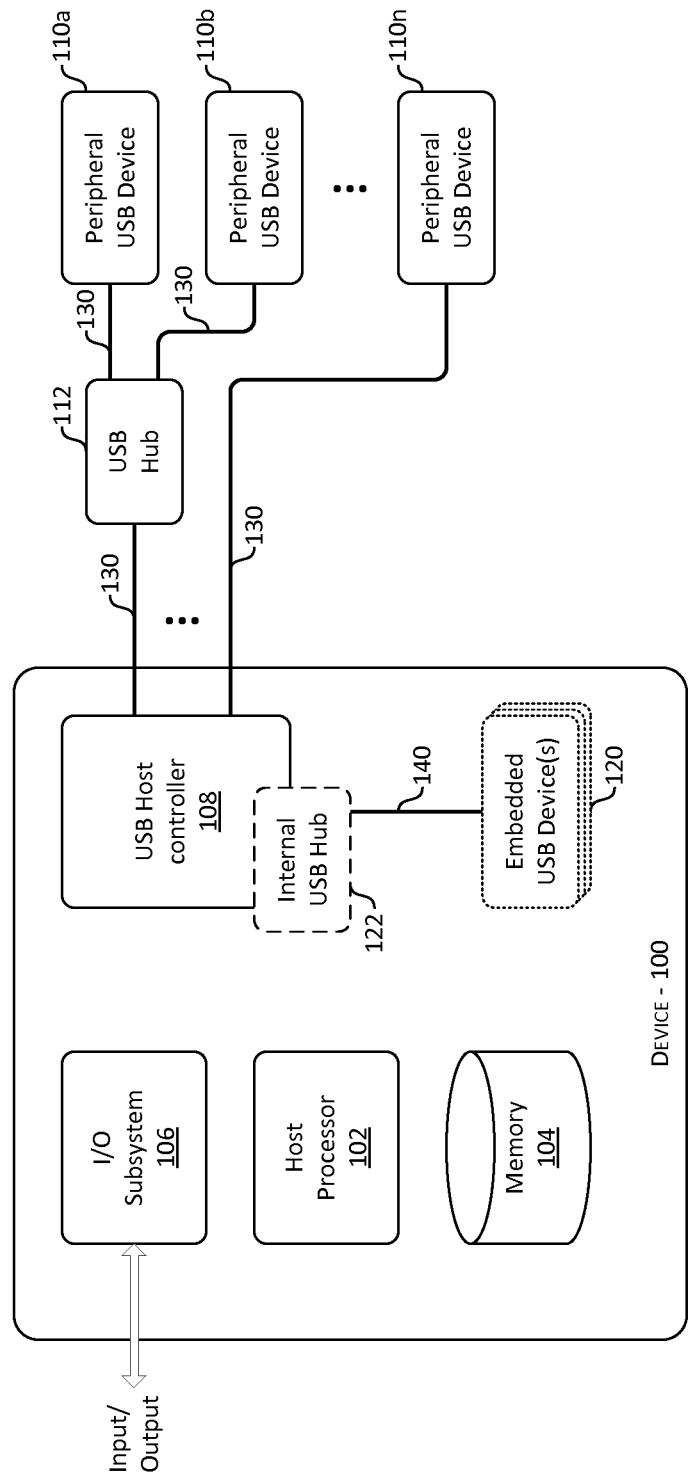
FIG. 1A is a block diagram illustrating an exemplary computing device that may utilize USB communications, which may be utilized in accordance with an embodiment of the invention.

FIG. 1A is a block diagram illustrating an exemplary computing device that may utilize USB communications, which may be utilized in accordance with an embodiment of the invention. Referring to FIG. 1A, there is shown a computing device 100, a host processor 102, a system memory 104, an input/output (I/O) subsystem 106, and a Universal Serial Bus (USB) host controller 108, one or more embedded USB devices 120, and an internal USB hub 122. Also shown in FIG. 1A is a plurality of peripheral USB devices 110a-110n, and a USB hub 112.

The computing device 100 may comprise suitable logic, circuitry, interfaces, and/or code that may be operable to perform various tasks and/or execute various applications, based on preloaded instructions and/or user input for example. The computing device 100 may comprise a personal computer (PC), a laptop (notebook), a tablet computer, a server, a smartphone, and/or any other type of handheld personal communication devices. The computing device 100 may comprise, for example, the host processor 102, the system memory 104, the I/O subsystem 106, and the USB host controller 108. In this regard, the host processor 102 may provide overall control and/or management of the operations of the computing device 100; the I/O subsystem 106 may enable user interactions with the computing device 100; and the USB host controller 108 may enable USB based communication of data and/or messages to and/or from the computing device 100, internally and/or externally, when executing various tasks and/or applications in the computing device for example. The computing device 100 may also comprise other resources, internal and external, such as the peripheral USB devices 110a-110n and/or the embedded USB devices 120, which may be utilized to perform additional, dedicated or specialized tasks or functions.

The host processor 102 may comprise suitable logic, circuitry, interfaces and/or code that may be operable to process data, and/or control and/or manage operations of the computing device 100, and/or tasks and/or applications performed therein. In this regard, the host processor 102 may be operable to configure and/or control operations of various components and/or subsystems of the computing device 100, by utilizing, for example, one or more control signals. The host processor 102 may also control data transfers within the computing device 100. The host processor 102 may enable execution of applications, programs and/or code, which may be stored in the system memory 104 for example. The system memory 104 may comprise suitable logic, circuitry, interfaces and/or code that enable permanent and/or non-permanent storage and/or fetching of data, code and/or other information in the computing device 100. In this regard, the system memory 104 may comprise one or more memory devices and/or may implement incorporate one or more memory technologies, including, for example, read-only memory (ROM), random access memory (RAM), and/or Flash memory. The system memory 104 may store, for example, configuration data, which may comprise parameters and/or code, comprising software and/or firmware, but the configuration data need not be limited in this regard.

The I/O subsystem 106 may comprise suitable logic, circuitry, interfaces, and/or code that may enable inputting and/or outputting data and/or messages, to support user interactions with the computing device 100 for example, such that to enable receiving user input and/or providing user output. For example, the I/O subsystem 106 may facilitate interactions with the computing device 100 via one or more I/O devices, such as a monitor, a mouse, and/or keyboard.

The USB host controller 108 may comprise suitable logic, circuitry, interfaces, and/or code that may enable communicating with, and/or controlling or managing USB devices connected to and/or embedded into the computing device 100. The USB host controller 108 may comprise both physical and logical resources utilized in performing USB communication in instances where the computing device operates as a USB host. The USB host controller 108 may comprise, for example, USB driver and/or software, and/or USB specific physical connectors that enable communication of USB signals and/or processing or packaging thereof.

The plurality of peripheral USB devices 110a-110n may comprise devices and/or systems that may be connected to the computing device 100 to provide one or more dedicated functions. In this regard, the computing device 100 and the plurality of peripheral USB devices 110a-110n may communicate data and/or control messages over the Universal Serial Bus (USB) interface based connections or cables 130. Exemplary peripheral USB devices may comprise a mouse, a keyboard, an external storage device (e.g. external hard drive or a flash drive), a digital camera, a printer, a personal media player, and/or a (wired/wireless) network adapter. The embedded USB devices 120 may comprise devices that may be embedded within the computing device 100, but which communicate with the computing device 100, functioning as USB host, via internal USB connections and/or bus. Exemplary embedded USB devices may comprise embedded wireless network adapter cards.

The USB hub 112 may comprise suitable logic, circuitry, interfaces, and/or code that may be operable to multiplex USB connections between a plurality of USB devices and a single USB connector port in the computing device 100, to enable sharing a number of USB connector ports by a larger number of peripheral USB devices.

In operation, the computing device 100 may be utilized to execute various tasks, applications, and/or processes, via the host processor 102 for example. The tasks, applications, and/or processes executed by the computing device 100 may be performed based on preprogrammed instructions, in the system memory 104 for example, and/or may be triggered and/or controlled by, and/or may require user input and/or output, which may be received and/or provided via the I/O subsystem 106, for example. In an exemplary aspect of the invention, the computing device 100 may be operable to support USB based communications. In this regard, the computing device 100 may be configured and/or operated, via the USB host controller 108, as a USB host controlling and/or managing a USB network comprising internal and/or external USB devices and/or hubs, such as the plurality of peripheral USB devices 110a-110n, the USB hub 112, one or more of the embedded USB device 120, and/or the internal USB hub 122. USB communications external to the computing device 100 may be performed via connections 130, which may correspond to a plurality of USB connectors and/or cables. Internal USB communications within the computing device 100 may be performed via connections 140, which may correspond to internal USB interconnects between the USB host controller 108 and the embedded USB devices 120.

Currently, most USB systems, devices, networks, and/or communication are configured based on Serial Bus version 2.0 (USB2.0) specifications. In this regard, USB2.0 may be utilized to enable coupling peripheral devices, such one or more of the peripheral USB devices 110a-110n, using USB2.0 based cables and/or ports. Furthermore, while USB2.0 has been originally defined for external connectivity only, internal USB2.0 may also be possible, based on the USB High Speed Inter-Chip (HSIC) specification for example. However, USB HSIC defines a different physical interface, to enable internal USB based communications, incorporating different physical medium and/or connectivity, and requiring dedicated physical layer support at both of host and slave sides to enable USB based communication. In other words, while the data communication appears to be USB based exchanges, the physical connectivity may be performed in a manner that is different from standard USB2.0 physical connectivity during external communications. Furthermore, USB HSIC supports only up to 480 Mbps data rates, with a practical throughput of less than 360 Mbps and the mechanism by which physical connectivity is provided by the USB HSIC prevent increasing data throughputs beyond these rates. These rates, while previously sufficient, render the USB HSIC insufficient for use in next generation devices, which may require higher data rates, such as 802.11ac, which may typically require throughput of 600 Mbps or higher; 802.11ad, which may typically require throughput of 3 Gbps or higher; and/or other technologies such as WirelessHD and more. In addition, the USB2.0 architecture and protocol typically cause and/or require higher power consumption, especially in instances where multiple devices are combined into the same USB hierarchy. Accordingly, because USB2.0 hardware and software are so widely supported and matured, a solution that maintains and/or takes advantage of existing USB2.0 design and/or software infrastructure, but provide higher bitrates may be desired.

Recently, however, Universal Serial Bus version 3.0 (USB3.0) has been introduced. In this regard, the USB3.0 maintains backward compatibility with USB2.0 while defining a new mode, called SuperSpeed that supports much higher bitrates, such as 5 Gbps raw physical (PHY) layer rate with practical throughput of well over 3 Gbps in both the transmit (Tx) and receive (Rx) directions. Therefore, because of the considerable improvement in bitrates, it may be desirable to utilize the USB3.0 SuperSpeed for the next generation high speed inter-chip communication, especially in systems that presently utilize and/or support USB2.0. The USB3.0 SuperSpeed, however, is not currently defined for inter-chip communication. Rather, it is only defined for wired external communications. Furthermore, because the USB3.0 SuperSpeed is only defined for use over external connectors, and using cables of up to 3 meter length, power consumption associated with USB3.0 SuperSpeed is substantial. In this regard, the USB3.0 SuperSpeed, as presently defined, requires Tx modules used for USB3.0 SuperSpeed communications to drive USB communications at high powers, due to the maximum length of cables, and the USB SuperSpeed Rx modules to be configured to detect signals with lower swing and noisier signals. Therefore, the power consumption associated with USB3.0 SuperSpeed renders it undesirable for devices with limited power sources, such as mobile and handheld devices.

Accordingly, in various embodiments of the invention, low power SuperSpeed inter-chip (LP-SSIC) communications may be utilized to provide inter-chip connectivity with the higher bitrates offered by USB3.0 SuperSpeed, while reducing power consumption associated with external USB3.0 communications, and maintaining and/or utilizing existing USB2.0 support and/or familiarity. In this regard, various modifications and techniques may be used to enable use of the USB3.0 SuperSpeed within devices, such as the computing device 100, and/or to reduce power consumption associated with internal use of the USB3.0 SuperSpeed. Power saving related determinations, and/or modifications based thereon may be initially preformed at design or manufacture time, and/or it may be performed adaptively and/or dynamically thereafter, during use of the computing device 100 for example.

The power consumption reduction and/or optimization may relate to selection and/or use of physical resources associated with USB communication within the computing device 100. In this regard, the physical resources may comprise physical medium utilized to facilitate inter-chip SuperSpeed communication, and/or configuration or operations of the physical medium and/or any physical resources utilized during transmitting and/or reception of signals therein. The LP-SSIC communications may incorporate at the interconnect level, for example, specialized interconnects that are more suited for internal communications. Furthermore, various features and/or parameters that may be more suited for external communications may be modified and/or adjusted for use in conjunction with inter-chip communication within a device. For example, printed circuit board (PCB) traces may be utilized in providing inter-chip USB3.0 SuperSpeed communications. Furthermore, inter-chip USB3.0 SuperSpeed communication may be performed using, for example, scalable low voltage signaling input/output (SLVS IO), which may provide low power, scalable voltage swing operations during inter-chip USB3.0 SuperSpeed communications. Another way to further reduce and/or optimize power consumption during inter-chip SuperSpeed communication may comprise utilizing and/or defining optimal shortest maximum trace length, in instances where interconnectivity is provided via PCB traces for example, for each target form-factor (FR) and use case, based on device type for example. In this regard, the shortest maximum trace length may be set to ~10 cm FR-4 when the computing device 100 may correspond to a cellphone; to ~20 cm FR-4 when the computing device 100 may correspond to a tablet; or to ~30 cm FR-4 when the computing device 100 may correspond to a netbook or notebook. Furthermore, connectivity may be limit to 1 connector (plug/receptacle), and/or no flex and/or no micro-coax may be allowed, when deemed necessary to further enhance power saving for example.

Another way to further reduce and/or optimize power consumption during inter-chip SuperSpeed communication may comprise disabling receiver (Rx) equalization processing. In this regard, Rx equalization, which is utilized to mitigate and/or reduce jitters and/or noises that may be occur during communication of USB signals, may not be necessary during inter-chip communication since introduction of noise or jitter is more commonly associated with external communication, such as via external cables that are subject to external interference sources. Furthermore, different interference related parameters may be utilized during internal SuperSpeed communication for similar reasons. In this regard, different and/or lower target jitter parameters, comprising deterministic jitter (Dj), random (Rj), and/or total jitter (Tj), which is based on Dj and Rj, corresponding to shorter communication lengths and/or less noisier channels may be utilized, to enable reducing power consumption as a result of less demanding processing during reception of the signals for example. Similarly, a lower target bit error rate (BER) may be defined and/or configured based on the more reliable nature of internal communication, to minimize power consumption.

The power consumption reduction and/or optimization may also be achieved based on adjustments to the overall protocol as applied to internal communications, and/or based on modification and/or configuration of various logical resources based thereon that are associated with USB communication. This may comprise, for example, state machines, configuration parameters, and/or control or management criteria and/or mechanisms. For example, an adaptive link differential IO Swing training sequence may be utilized to set the IO Swings utilized in conjunction with scalable low voltage signaling input/output (SLVS IO). In this regard, the training sequence may enable reliably setting the IO Swing to the lowest possible value for a particular platform, and/or under particular conditions. This may comprise setting the IO Swing to a pre-configured default value, and incrementing or decrementing the IO Swing based on determination of success/failure of loopback communication via the inter-chip interconnect. The LP-SSIC may also be configured to support only SuperSpeed operation. In this regard, removing USB2.0 related resources and/or functionality, such as some USB2.0 link related and/or physical (PHY) layer related functions, and/or related resources, such as phase lock loops (PLLs), on both host-side and device-side, saving substantial power and die area. Accordingly, the USB state machine may be modified to prevent any fallback and/or transition to USB2.0 related states.

Furthermore, because the different nature of the internal and external communication, state machines associated with physical resources may be modified to enable shutting off these physical resources and/or transitioning them to low power states due to the nature of the internal communications. For example, power saving associated with link state U1 may be enhanced by turning off phase lock loop (PLL) that may be utilized during SuperSpeed communication, when target use case may allow for doing so. This determination may be performed based on, for example, use percentage rate of the available maximum bandwidth. In this regard, USB3.0 defines U0, U1, U2, U3 such that, the longer link partners remain idle, the deeper the power savings by progressing from U0 to U1, to U2, and finally to U3. With external based SuperSpeed communications, however, during U1 link state the PLL is typically kept turned on, and the exit (turning off) latency is predominantly determined based on the time required to achieve symbol lock between link partners. Accordingly, the PLL turning off criteria for state U1 may be modified for internal SuperSpeed communication, to enable performing it much sooner compared to timing of PLL turning off criteria for external SuperSpeed communication. In this regard, the determination of when to turn off the PLL and/or to put the USB3.0 controller into progressively lower power state may be based on, for example, max (internal) traffic rate, use patterns, and/or transmitter (Tx) FIFO buffer sizes. In addition, power gating can also be applied to the U1 state, based on the determination that time to resume from power gating is less than PLL lock time for example.

Figure 1B:
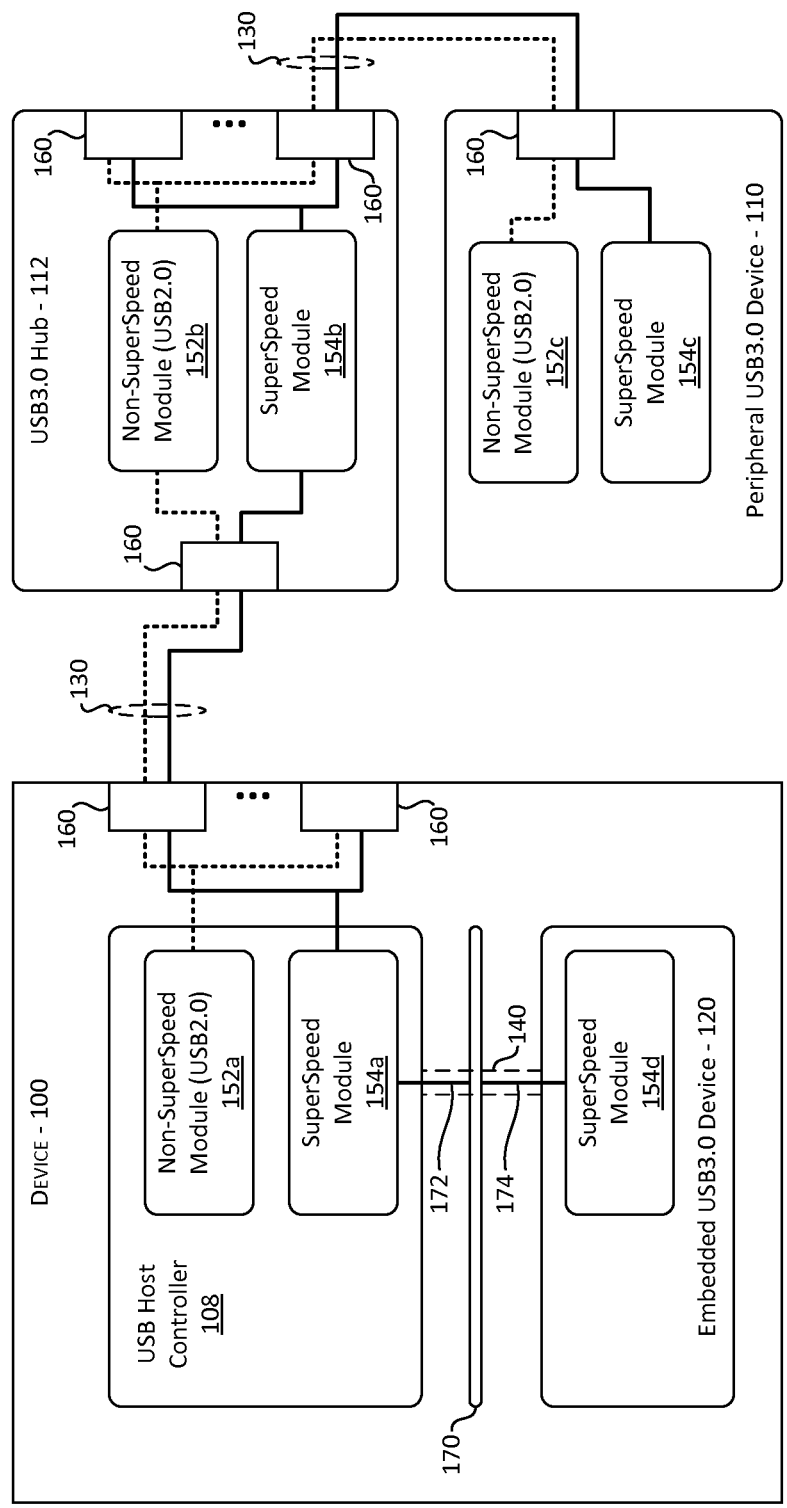
FIG. 1B is a block diagram illustrating an exemplary computing device that may support external and internal USB3.0 SuperSpeed communications, in accordance with an embodiment of the invention.

FIG. 1B is a block diagram illustrating an exemplary computing device that may support external and internal USB3.0 SuperSpeed communications, in accordance with an embodiment of the invention. Referring to FIG. 1B, there is shown the computing device 100, the USB host controller 108, the embedded USB device 120, the peripheral USB device 110, and the USB hub 112. Also shown in FIG. 1B is Non-SuperSpeed modules 152a-152c, SuperSpeed modules 154a-154d, and USB connector ports 160.

Each USB connector port 160 may comprise suitable logic, circuitry, interfaces, and/or code that may enabling receiving and/or terminating (e.g., by plugging) a USB connector or cable. The USB connector ports 160 may support both non-SuperSpeed (USB2.0) and SuperSpeed connections. Alternatively, different connector ports may be utilized for each of non-SuperSpeed (USB2.0) and SuperSpeed connections.

Each of the non-SuperSpeed modules 152a-152c may comprise suitable logic, circuitry, interfaces, and/or code that may be operable to handle non-SuperSpeed USB communication. In this regard, non-SuperSpeed USB communication may comprise legacy USB2.0 communication related functionality. Each of the SuperSpeed modules 154a-154d may comprise suitable logic, circuitry, interfaces, and/or code that may be operable to handle and/or process SuperSpeed USB communication.

In operation, the computing device 100 may be operable to utilize USB3.0 SuperSpeed for external USB communications, in addition to and/or in lieu of USB2.0 based communications. For example, USB2.0 communications may be exchanged between the computing device 100, the USB hub 112, and/or the peripheral USB device 110 via connections 130. In this regard, the non-SuperSpeed modules 152a, 152b, and 152c in the USB host controller 108 of the computing device 100, the USB hub 112, and the peripheral USB device 110, respectively, may be utilized to handle reception and/or transmission of USB2.0 based signals. Similarly, USB3.0 SuperSpeed based communications may also be exchanged between the computing device 100, the USB hub 112, and/or the peripheral USB device 110 via connections 130. In this regard, the SuperSpeed modules 154a, 154b, and 154c in the USB host controller 108 of the computing device 100, the USB hub 112, and the peripheral USB device 110, respectively, may be utilized to handle reception and/or transmission of USB3.0 based signals.

In an exemplary aspect of the invention, USB3.0 SuperSpeed based communications may also be utilized internally, within the computing device 100, to enable high bitrate USB based exchanges with the embedded USB device 120 for example. In this regard, the embedded USB device 120 may utilize the SuperSpeed modules 152d to support handling and/or processing of USB3.0 SuperSpeed based signals transmitted to and/or received from the USB Host controller 108. Furthermore, the USB Host controller 108 may be configured to support internal, SuperSpeed inter-chip based communication within the computing device 100. In this regard, the computing device 100 may be configured to provide internal SuperSpeed based inter-chip connectivity. The SuperSpeed inter-chip connectivity may be enabled via an internal inter-chip interconnect 170, into which the USB host controller 108 and the embedded USB device(s) 120 may be connected via connectors 172 and 174, respectively. In this regard, the inter-chip interconnect 170 may comprise a printed circuit board (PCB) for example, such as inter-chip connectivity may be provided in the form of PCB traces.

In various embodiments of the invention, power consumption associated with internal SuperSpeed communication within the computing device 100 may be reduced and/or optimized, compared to, for example, power consumption associated with external USB3.0 SuperSpeed communications, substantially as described with regard to FIG. 1A. For example, the interconnect 170 may be configured to provide inter-chip USB3.0 SuperSpeed communications based on scalable low voltage signaling input/output (SLVS IO), which may provide low power, scalable voltage swing operations. Furthermore, both the host-side SuperSpeed module 154a and the device-side SuperSpeed module 154d may be configured to implement and/or support use of one or more various power saving options and/or techniques, such as at least some of these options and/or techniques described with regard to FIG. 1A.

Figure 2:
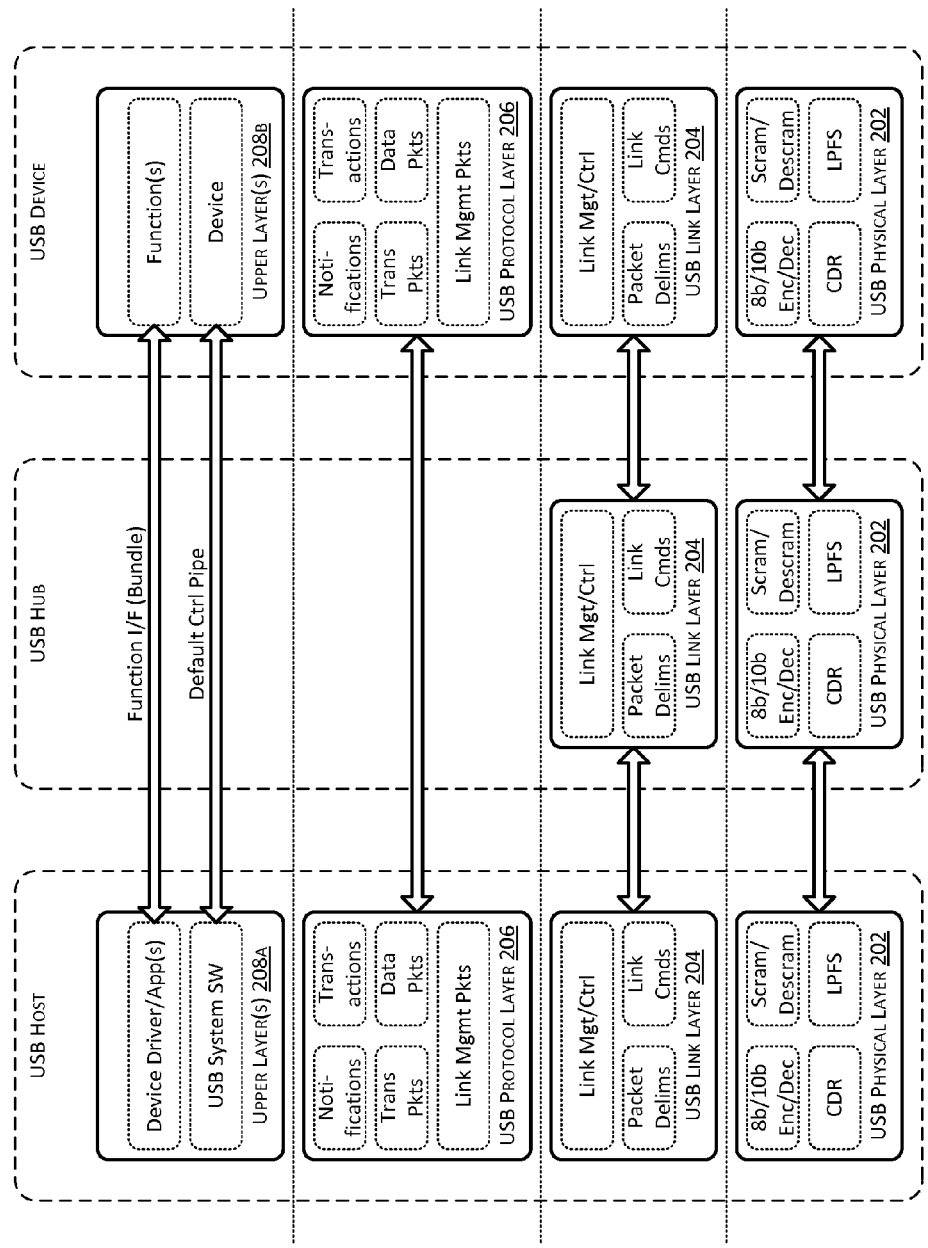
FIG. 2 is a diagram illustrating an exemplary high-level layered architecture of USB3.0 SuperSpeed, which may be utilized in accordance with an embodiment of the invention

FIG. 2 is a diagram illustrating an exemplary high-level layered architecture of USB3.0 SuperSpeed, which may be utilized in accordance with an embodiment of the invention. In this regard, the USB3.0 SuperSpeed architecture may comprise a hierarchy of layers that may be utilized in conjunction with USB communications, such as USB physical layer 202, USB link layer 204, and/or USB protocol layer 206.

The USB physical layer 202 may handle physical connectivity between connected physical resources during USB communications. In this regard, the USB physical layer 202 may handle reception and/or forwarding of USB signals communicated via physical USB connections between entities within USB network layers, on both ends of each physical connection, such as between two connected USB ports. Accordingly, the USB physical layer 202 runs in each USB network element, such as each of the USB host, the USB device(s), and the USB hub(s). The USB physical layer 202 may perform various functions comprising, for example, 8b/10b encoding and/or decoding, low frequency periodic signaling (LFPS), scrambling/descrambling, and/or clock/data recovery (CDR).

The USB link layer 204 may handle logical connectivity between connected physical resources during USB communications. Accordingly, the USB link layer 204 must run in each USB network element, such as each of the USB host, the USB device(s), and the USB hub(s). In this regard, the USB link layer 204 may manage handling of data communicated via associated physical resources. This may comprise timing, buffering, formatting, delivery controls, and/or link power management. Furthermore, each instance of the USB link layer 204 may logically manage operations of associated physical resources. The USB link layer 204 may also providing interfacing functionality to the USB protocol layer 206 to enable interacting with the USB physical layer 202. For example, USB link layer 204 may maintain state machines controlling operations of the associated physical resources and/or physical connection(s) therebetween. The USB link layer 204 may perform various functions comprising, for example, link management and control, packet delimiters, and/or link command generation and/or handling, to enable interaction with link partner(s).

The USB protocol layer 206 provides end-to-end handling of USB communication, regardless of the actual physical resources utilized in USB signal forwarding. Accordingly, the USB protocol layer 206 need only run in the USB host and the endpoint USB device. All USB protocol layer 206 level interactions may be packet based communications. Exemplary packets exchanged at the protocol level may comprise data packets, transaction packets, and/or link management packets. In this regard, the data packets may be utilized to communicate data, the transaction packets may be utilized to communicate transaction related information, and the link management packets may be utilized to communicate link management related information between the host-side and the device-side. The link management packets, however, may be exchanged only between link partners, and as such, may not be exchanged at the protocol level. The USB protocol layer 206 may perform various functions comprising, for example, data packet processing function, transaction packet processing function, link management processing function, notifications handling function, and/or transactions handling function. In this regard, each of the packet processing function, transaction packet processing function, link management processing function may be operable to perform generation, reception, transmission, and/or handling of data packets, transaction packets, and link management packets, respectively. The notification handling function may be utilized for generation and/or processing of notifications, such as status related notification, exchanged between the host-side and the device-side. The transactions handling function may be operable to handle establishment, management, and/or management of transactions, to exchange data for example, between the host-side and the device-side. The USB protocol layer 206 may also perform link management packet processing, to enable interaction with corresponding instances of the USB link layer 204 for example.

The upper layers 208a and 208b may run in the USB host and USB device on top of the USB layers to enable establishing, configuring, and/or utilizing USB functionality and/or communications, and/or performing applications and/or functions associated therewith. For example, the upper layer (s) 208a at the host-side may comprise USB system software (SW) which may be utilized for driving and/or controlling the USB network, and/or to drive USB communication performed through it. Furthermore, the host-side upper layer(s) 208a may also comprise dedicated USB device drivers and/or application functions to enable interacting with different USB devices that may be connected to the USB host, and/or to use any specialized function perform thereby. For example, the host-side upper layer(s) 208a may comprise device drivers and/or application software for USB connected printers, network adapters, and/or storage devices. Correspondingly, the device-side upper layer(s) 208b may comprise specific functions that may be utilized to performed specific tasks requested by the host-side.

In various embodiments of the invention, embedded USB devices, such as the embedded USB device 120 may incorporate the USB3.0 SuperSpeed layered architecture to support use and/or operations of low power SuperSpeed inter-chip (LP-SSIC) communications. Furthermore, various aspects of the USB3.0 SuperSpeed layered architecture may be modified and/or adjusted to support low power SuperSpeed inter-chip (LP-SSIC) communications. For example, the USB physical layer 202, and/or functions therein, may be modified and/or adjusted to enable support of scalable low voltage signaling input/output (SLVS IO) based communications. The link layer 204 may also be configured to support LP-SSIC, by removing and/or modifying functions performed based thereon. For example, link state U1 may be modified to allow turning off or disabling PLLs, under different conditions during internal inter-chip SuperSpeed communication compared with external SuperSpeed communication, substantially as described with regard to FIG. 1A. Similarly, the protocol layer 206 may be configured, by modifying and/or removing functions performed based thereon, to support LP-SSIC. For example, The LP-SSIC may be configured to support only SuperSpeed operation. In this regard, removing USB2.0 related resources and/or functionality, on both host-side and device-side, may yield saving substantial power and die area. Accordingly, the USB protocol based state machine may be modified to prevent any fallback and/or transition to USB2.0 related states.

Figure 3:
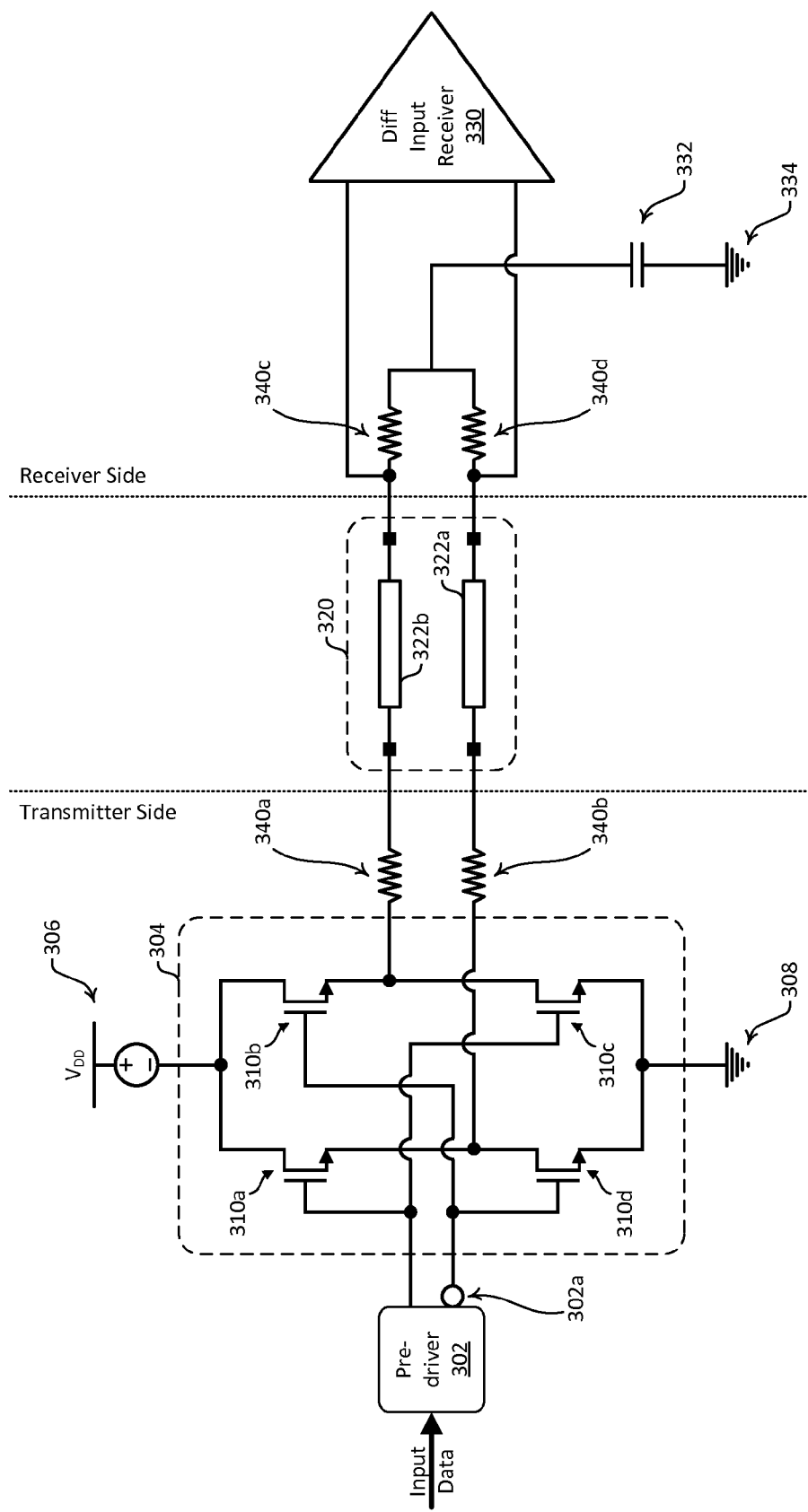
FIG. 3 is a block diagram illustrating an exemplary inter-chip connect that may be utilized in low power SuperSpeed inter-chip (LP-SSIC) communications, in accordance with an embodiment of the invention.

FIG. 3 is a block diagram illustrating an exemplary inter-chip connect that may be utilized in low power SuperSpeed inter-chip (LP-SSIC) communications, in accordance with an embodiment of the invention. Referring to FIG. 3, there is shown a pre-driver 302, a differential output driver 304, an inter-chip connect 320, a differential input receiver 330, a common mode (CM) capacitor 332, and a plurality of resistors 340a-340d.

The pre-driver 302 may comprise suitable logic, circuitry, interfaces, and/or code that may be operable to receive input data, and to utilize that input data to drive the differential output driver 304 to facilitate transmission to the receiver side. In this regard, the pre-driver 302 may facilitate communication of the input data, one bit at time. The pre-diver 302 may forward each bit as two input, one unchanged, and the second inverted via inverter 302a.

The differential output driver 304 may comprise suitable logic, circuitry, interfaces, and/or code that may be operable to generate a low swing differential output corresponding to two inputs. In this regard, the differential output driver 304 may generate low swing differential output voltage that may be utilized to push a current via the inter-chip connect 320 based on input data received by the pre-driver 302. The differential output driver 304 may comprise four transistors 310a-310d, which may be utilized to direct current between regulated voltage from positive voltage supply 306 and ground 308 in a manner that generate positive and negative voltage in the inter-chip connect 320, such that to generate the difference between logical high and low representing input data bits. For example, for bit "1," transistors 310a and 310c are closed and transistors 310b and 310d are opened. Alternatively, for bit "1," transistors 310a and 310c are opened and transistors 310b and 310d are closed.

The inter-chip connect 320 may comprise suitable logic, circuitry, interfaces, and/or code that may enable communication of signals within a device, including USB3.0 SuperSpeed signals for example. In this regard, the inter-chip connect 320 may comprise a plurality of printed circuit board (PCB) traces, such as PCB traces 322a and 322b, which may be utilized for connecting the transmitters and receivers of the USB host and the USB device. The plurality of resistors 340a-340d may be set and/or utilized to enable minimizing and/or eliminating signal reflections during communications via the inter-chip connect 320. The plurality of resistors 340a-340d may be configurable. In this regard, the resistors 340a-340d may be set to match the impedance in the inter-chip connect 320 during communication of signals therein. For example, in instances where each of the PCB traces 322a and 322b is determined to have an impedance of 50 ohms, each of the resistors 340a-340d may also be set to 50 ohms, thus eliminating or minimizing signal reflection during signal communication via the PCB traces 322a and 322b. The inter-chip connect 320 may be terminated at the receiver side, using the CM capacitor 332 and ground 334 for example. In this regard, the CM capacitor 332 may be utilized to eliminate and/or minimize return loss that may result when receiving current flowing through the inter-chip connect 320 to and/or from the differential output driver 304 at the transmitter side.

The differential input receiver 330 may comprise suitable logic, circuitry, interfaces, and/or code that may be operable to receive signals, at the receiver side in USB3.0 based communication, which may be transmitted as low swing differential output from the transmit side. In this regard, the differential input receiver 330 may be utilized to receive and/or amplify signaling received based on current flow via the inter-chip connect 320, corresponding to operations of the differential output driver 304 at the transmitter side. The amplification performed by the differential input receiver 330 may enable determining whether the signals correspond to input "1" or "0" bits.

Figure 4:
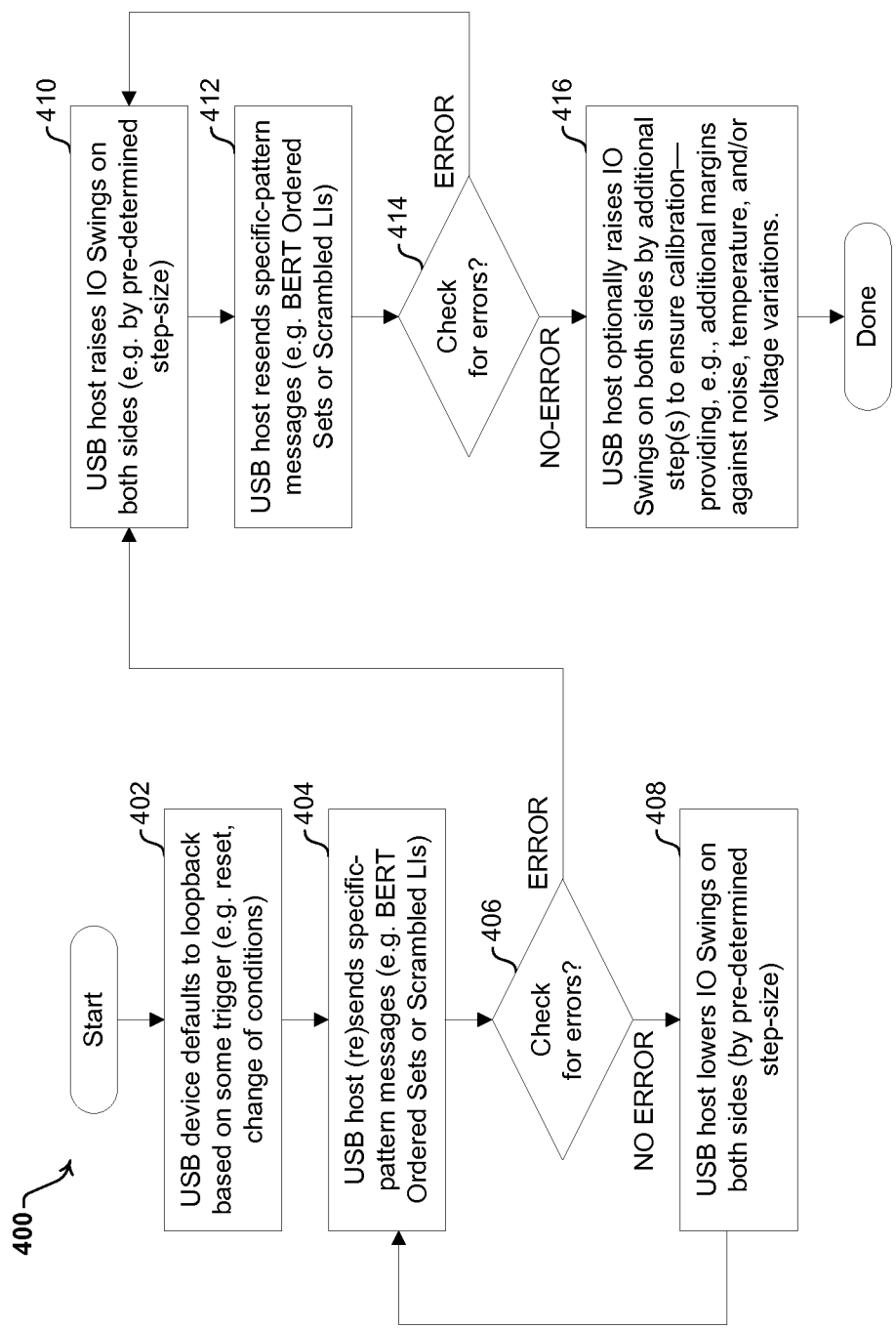
FIG. 4 is a flow chart that illustrates exemplary steps for utilizing low power SuperSpeed inter-chip (LP-SSIC) communications, in accordance with an embodiment of the invention.

FIG. 4 is a flow chart that illustrates exemplary steps for utilizing low power SuperSpeed inter-chip (LP-SSIC) communications, in accordance with an embodiment of the invention. Referring to FIG. 4, there is shown a flow chart 400 comprising a plurality of exemplary steps for performing adaptive link differential IO Swing training sequence.

In step 402, an embedded LP-SSIC USB device that may support LP-SSIC communication, which may correspond to the embedded USB device 120 for example, may default to loopback sequence after one or more triggers. In this regard, triggers may comprise reset and/or change of condition affecting the LP-SSIC USB device and/or a corresponding LP-SSIC USB host that may also support LP-SSIC communication, which may correspond to the computing device 100 as whole and/or the USB host controller 108 therein for example. In step 404, the LP-SSIC USB host may repeatedly send to the LP-SSIC USB device one or more messages of pre-determined pattern, such as Bit Error Rate Test (BERT) Ordered Sets and/or Scrambled logical idles (LI). In step 406, the LP-SSIC USB host may check for errors. In this regard, failure to receive acknowledgement and/or response from the LP-SSIC USB device may be construed as a failure. In instances where an error is detected, the plurality of exemplary steps may proceed to step 408. In step 408, the IO Swings may be lowered on both sides, at the LP-SSIC USB host and the LP-SSIC USB device, by pre-determined lowering step-size. In this regard, the step-size may be pre-configured, at design and/or manufacture time for example. The plurality of exemplary steps may then proceed back to step 404.

Returning to step 406, in instances where no error is detected, the plurality of exemplary steps may proceed to step 410. In step 410, the IO Swings may be raised on both sides, at the LP-SSIC USB host and the LP-SSIC USB device, by pre-determined raising step-size. In this regard, the step-size may be pre-configured, at design and/or manufacture time for example. In step 412, the LP-SSIC USB host may repeatedly send to the LP-SSIC USB device one or more messages of pre-determined pattern, such as BERT Ordered Sets and/or Scrambled logical idles (LI). In step 414, the LP-SSIC USB host may check for errors. In this regard, failure to receive acknowledgement and/or response from the LP-SSIC USB device may be construed as a failure. In instances where an error is detected, the plurality of exemplary steps may return to step 410. In instances where no error is detected, the plurality of exemplary steps may proceed to step 416. In step 416, the IO Swings may optionally be raised on both sides, at the LP-SSIC USB host and the LP-SSIC USB device, by one or more pre-determined raising step-sizes, as a safety measure to ensure calibration. In this regard, raising IO Swings, on both sides, may provide additional margins against noise, temperature, and/or voltage variations. The step-sizes utilized in raising the IO Swings may be pre-configured, at design and/or manufacture time for example.

Various embodiments of the invention may comprise a method and system for utilizing low power SuperSpeed inter-chip (LP-SSIC) communications. The computing device 100, which may be operable to support use of Universal Serial Bus version 3.0 (USB3.0) interface for external communication with one or more of the peripheral USB devices 100a-110n, may be configured to provide low power, internal USB3.0 SuperSpeed based communication of data within the computing device 100, between the USB host controller 108 and the embedded USB device 120 for example. In this regard, internal communications of data between the USB host controller 108 and the embedded USB device 120 may be performed via USB3.0 SuperSpeed signaling using the SuperSpeed modules 154a and 154d. The SuperSpeed module 154a may be configured, for example, to allow and/or support USB3.0 internal communication of data within the computing device 100. Furthermore, USB3.0 based internal connectivity and/or communication within the computing device 100 may be configured to reduce and/or optimized power consumption during USB3.0 internal communication of data, compared to external USB3.0 communications for example. Power reduction configuration, for USB3.0 based internal communications, may comprises modifying and/or adjusting physical (PHY) layer, link layer, and/or protocol layer related parameters, functions, resources, and/or operations. In this regard, USB3.0 SuperSpeed based signals may be communicated within the computing device 100 using scalable low voltage signaling (SLVS). Furthermore, Input/Output (IO) Swing may be set based on loopback training sequence. The loopback training sequence may comprise setting the IO Swing to a default value at start of the loopback training sequence; and incrementing or decrementing the IO Swing based on determination of error during loopback communication. In addition, one or more link operation states may be configured and/or modified for internal USB3.0 communication, wherein the modification may comprise turning off Phased Locked Loop (PLL) used for the USB3.0 SuperSpeed based signals during link state U1. Furthermore, USB2.0 operations may be disabled during internal USB3.0 based communications with the embedded USB device 120. Additional measures may also be utilized to reduce and/or optimize power consumption during internal USB3.0 based communication, such as, for example, utilizing and/or configuring different PCB trace length and/or parameters, grounding, and/or shielding, which may enable disabling adaptive Rx equalization and/or reducing BER requirements.

Other embodiments of the invention may provide a non-transitory computer readable medium and/or storage medium, and/or a non-transitory machine readable medium and/or storage medium, having stored thereon, a machine code and/or a computer program having at least one code section executable by a machine and/or a computer, thereby causing the machine and/or computer to perform the steps as described herein for utilizing low power SuperSpeed inter-chip (LP-SSIC) communications.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method in a computing device that comprises a Universal Serial Bus (USB) host and a USB slave device, wherein said computing device is configured to support use of a USB interface, the method comprising:
configuring said USB host to utilize said USB interface during communication of data within said computing device, wherein said configuration comprises configuring one or more power consumption reduction parameters that control said USB host or said USB interface; and
using scalable low voltage signaling (SLVS) while communicating said data between said USB host and said USB slave device using a USB defined inter-chip communication based on said configuration, said using SLVS including raising an input/output voltage swing in said USB host or in said USB slave device when an error is detected while communicating said data, and lowering said input/output voltage swing when said error is not detected.

2. The method according to claim 1, wherein said computing device comprises: a personal computer, a laptop computer, a tablet computer, a server, a smartphone, or a handheld personal communication device.

3. The method according to claim 1, wherein said configuration comprises:
modifying or adjusting physical (PHY) layer, link layer, or protocol layer related parameters, functions, resources, or operations of said USB interface for said communication of data.

4. The method according to claim 1, wherein said using SLVS further comprises:
setting the input/output voltage swing for communicating said data based on a loopback training sequence.

5. The method according to claim 4, wherein said setting the input/output voltage swing further comprises:
setting said input/output voltage swing to a default value at a start of said loopback training sequence.

6. The method according to claim 1, further comprising:
modifying a link operation state during said communication of data, wherein said modification comprises turning off a Phased Locked Loop (PLL) used for said USB defined inter-chip communication.

7. The method according to claim 1, further comprising:
setting shortest maximum trace length for target form-factor (FR) associated with said communication of data based on a determination of a type of said computing device.

8. The method according to claim 1, further comprising:
disabling operations of a second USB defined inter-chip communication during communications with said USB slave device.

9. The method according to claim 8, wherein said disabling comprises:

removing links related to said second USB defined inter-chip communication, Physical (PHY) layer support, or Phased Locked Loop (PLLs), or disabling a jump to one or more states related to said second USB defined inter-chip communication in at least one USB state machine.

10. A computing device comprising:
a Universal Serial Bus (USB) host;
a USB slave device; and
a USB interface, wherein
said USB host or said USB slave device is configured to utilize said USB interface during communication of data within said computing device, to configure one or more power consumption reduction parameters, and to use scalable low voltage signaling (SLVS) while communicating said data between said USB host and said USB slave device using a USB defined inter-chip communication based on said configuration, wherein
to use said SLVS, said USB host or said USB slave device is configured to raise an input/output voltage swing associated with communication of said data when an error is detected while communicating said data, and to lower said input/output voltage swing when said error is not detected.

11. The computing device according to claim 10, wherein the computing device is one of: a personal computer, a laptop computer, a tablet computer, a server, a smartphone, or a handheld personal communication device.

12. The computing device according to claim 10, wherein said USB host or said at least one USB slave device is configured to modify or adjust a physical (PHY) layer, a link layer, or protocol layer related parameters, functions, resources, or operations of said USB interface for said communication of data.

13. The computing device according to claim 10, wherein said USB host or said USB slave device is configured to set the input/output swing for said communication of data based on a loopback training sequence.

14. The computing device according to claim 13, wherein said USB host or said USB slave device is configured to set said input/output swing to a default value at a start of said loopback training.

15. The computing device according to claim 10, wherein said USB host or said USB slave device is configured to modify a link operation state during said communication of data, wherein said modification comprises turning off a Phased Locked Loop (PLL) used for said USB defined inter-chip communication.

16. The computing device according to claim 10, wherein said USB host or said USB slave device is configured to set a shortest maximum trace length for target form-factor (FR) associated with said communication of data based on a determination of a type of said computing device.

17. The computing device according to claim 10, wherein said USB host or said USB slave device is configured to disable operations of a second USB defined inter-chip communication during communication with said USB slave device.

18. The computing device according to claim 17, wherein said USB host or said USB slave device is configured to remove links related to said second USB defined inter-chip communication, Physical (PHY) layer support, or Phased Locked Loop (PLLs), or to disable a jump to one or more states related to said second USB defined inter-chip communication in at least one USB state machine to disable said operations of said second USB defined inter-chip communication.

19. A universal serial bus (USB) host device capable of supporting low-powered super speed USB communication, said USB host comprising:
a transmitter configured to transmit, to a USB device, a message in a predetermined pattern when a loopback sequence associated with said USB device has been initiated; and
a processor configured to:
detect an error associated with transmission of said message; and
raise an input/output voltage swing in said USB host or in said USB device by a predetermined step-size when said error is detected, and to lower said input/output voltage swings by said predetermined step-size when said error is not detected.

* * * * *